(12) United States Patent
Vermillion et al.

(10) Patent No.: US 12,111,181 B2
(45) Date of Patent: Oct. 8, 2024

(54) LASER-BASED RANGEFINDING INSTRUMENT

(71) Applicants: Laser Technology, Inc., Centennial, CO (US); Kama-Tech (HK) Limited, Hong Kong (CN)

(72) Inventors: Jordan T. Vermillion, Overland Park, KS (US); Scott M. Peterson, Leawood, KS (US); Neil T. Heeke, Golden, CO (US); Eric A. Miller, Englewood, CO (US); Jeremy G. Dunne, Parker, CO (US); David W. Williams, Greenwood Village, CO (US)

(73) Assignees: Laser Technology, Inc., Centennial, CO (US); Kama-Tech (HK) Limited, Hong Kong (CN)

(*) Notice: Subject to any disclaimer, the term of this patent is extended or adjusted under 35 U.S.C. 154(b) by 39 days.

(21) Appl. No.: 17/497,448

(22) Filed: Oct. 8, 2021

(65) Prior Publication Data
US 2022/0026204 A1 Jan. 27, 2022

Related U.S. Application Data

(63) Continuation of application No. 15/895,822, filed on Feb. 13, 2018, now Pat. No. 11,168,982.

(60) Provisional application No. 62/458,969, filed on Feb. 14, 2017.

(51) Int. Cl.
| | |
|---|---|
| *G01S 7/51* | (2006.01) |
| *G01C 3/08* | (2006.01) |
| *G01S 7/481* | (2006.01) |
| *G01S 7/483* | (2006.01) |
| *G01S 17/10* | (2020.01) |
| *G01S 7/497* | (2006.01) |

(52) U.S. Cl.
CPC .............. *G01C 3/08* (2013.01); *G01S 7/481* (2013.01); *G01S 7/4813* (2013.01); *G01S 7/483* (2013.01); *G01S 7/51* (2013.01); *G01S 17/10* (2013.01); *G01S 7/497* (2013.01)

(58) Field of Classification Search
CPC . G01C 3/08; G01S 17/10; G01S 7/481; G01S 7/497; G01S 7/4813; G01S 7/51; G01S 7/483
USPC .......................................... 356/5.05
See application file for complete search history.

(56) References Cited

U.S. PATENT DOCUMENTS

| | | | |
|---|---|---|---|
| 7,937,878 B2 * | 5/2011 | Sammut | F41G 1/38 89/41.17 |
| 10,408,574 B2 * | 9/2019 | Guthrie | F41G 3/165 |

* cited by examiner

*Primary Examiner* — Daniel L Murphy
(74) *Attorney, Agent, or Firm* — Hogan Lovells US LLP

(57) ABSTRACT

A laser-based rangefinding instrument for, inter alia, golfing or hunting activities having an unique ergonomic design and an external multi-function switch for controlling display brightness, selectable display of differing distance units and a slope selection switch for enabling display of line of sight distance or angle of slope and "Compensated Golf Distance" slope distance to a target.

8 Claims, 12 Drawing Sheets

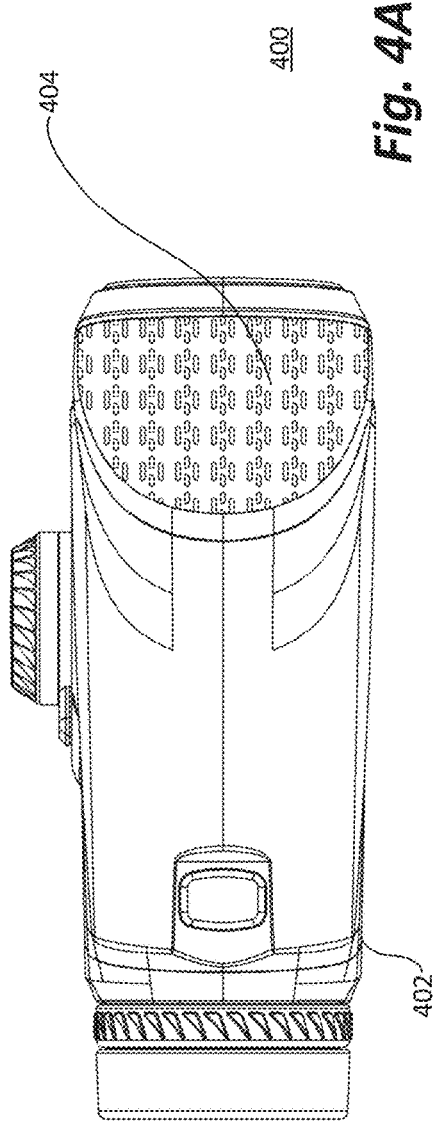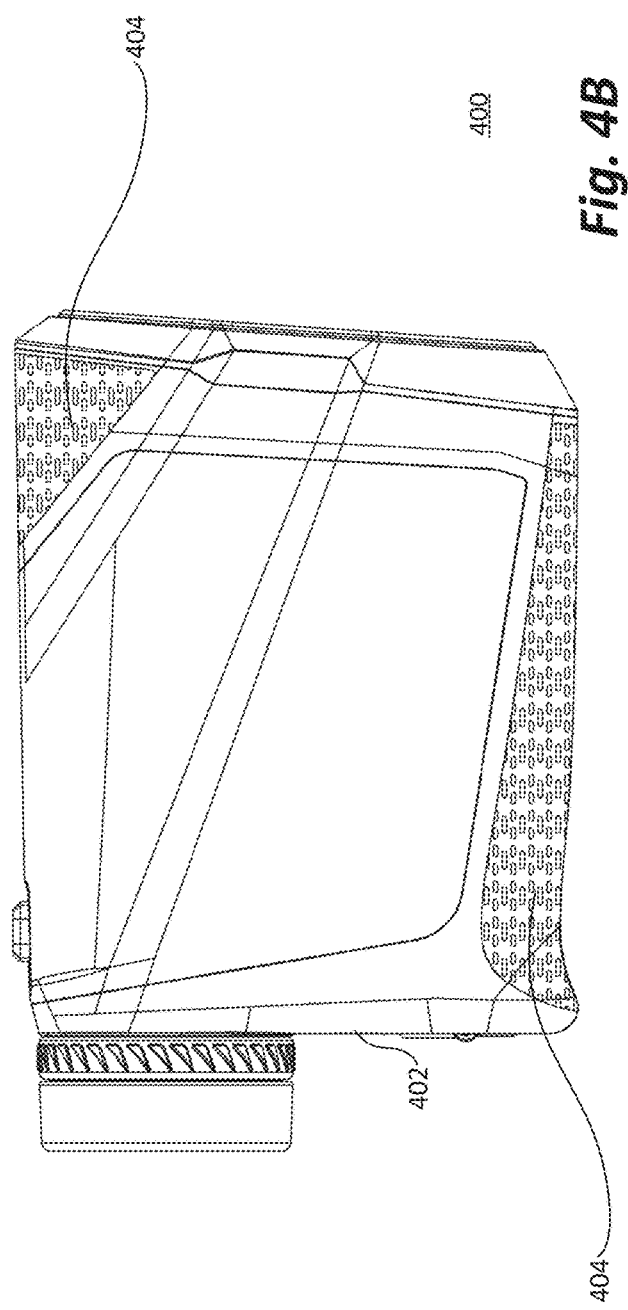

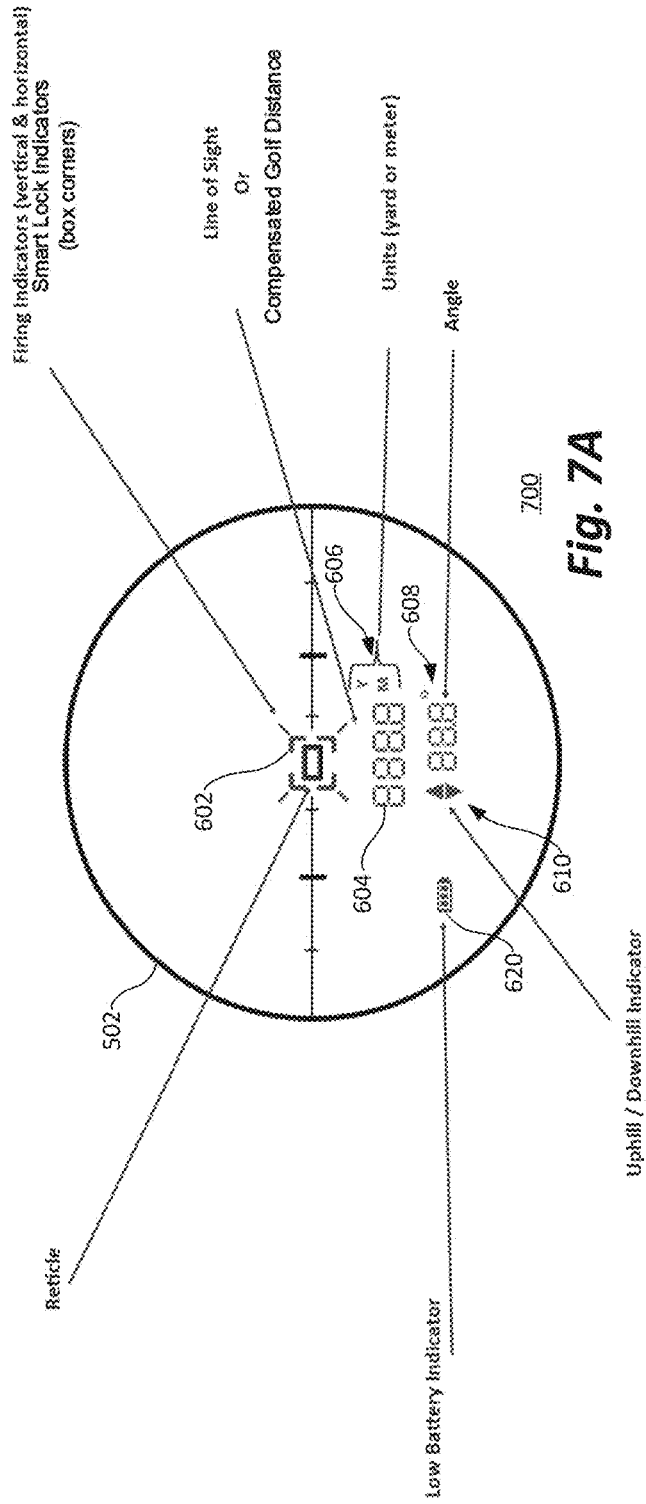
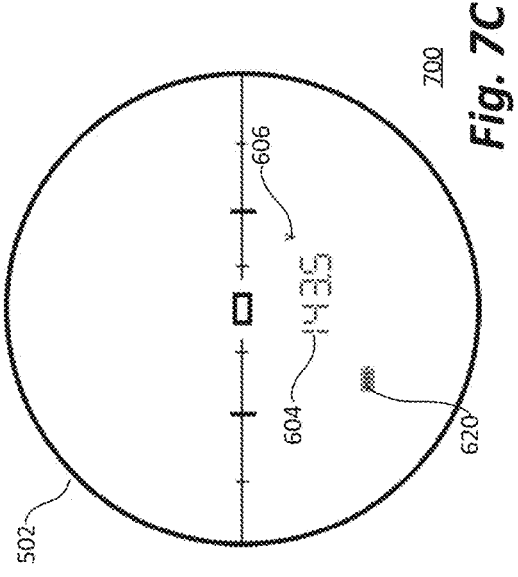
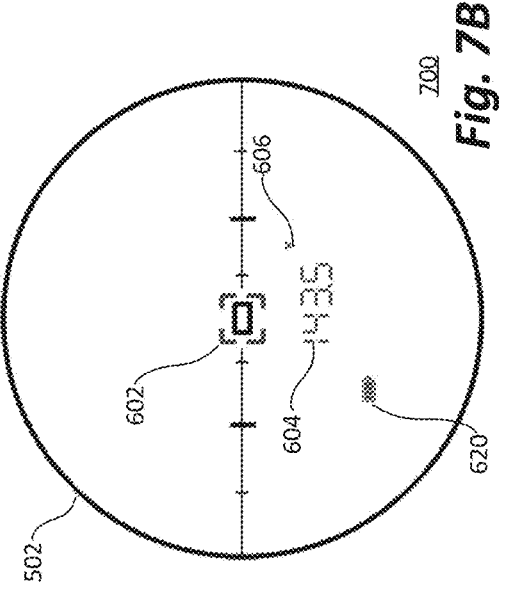
Fig. 7A
Fig. 7B
Fig. 7C

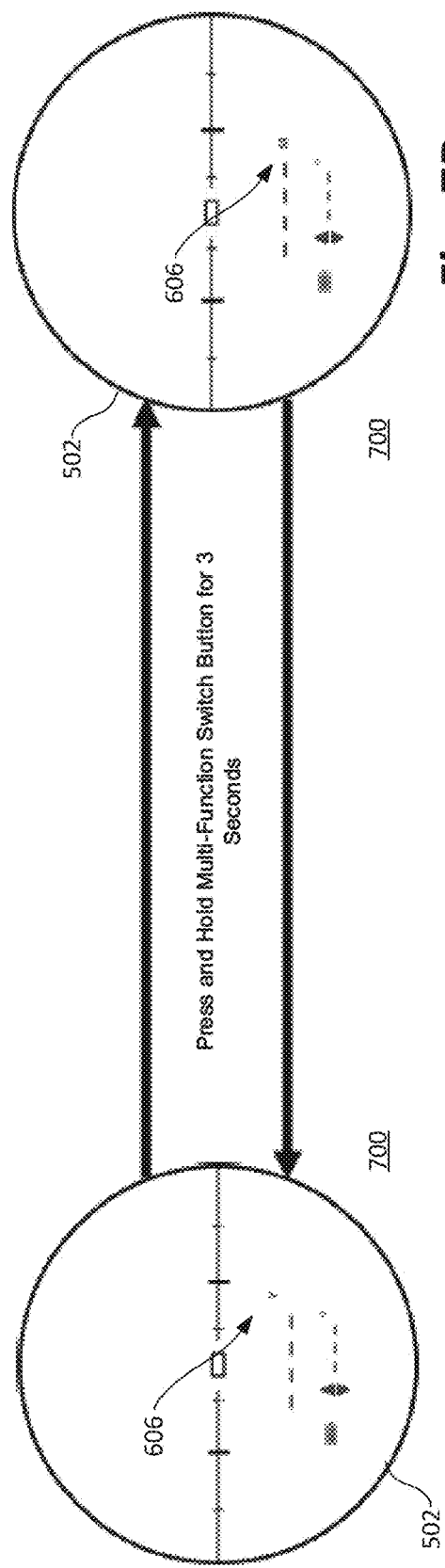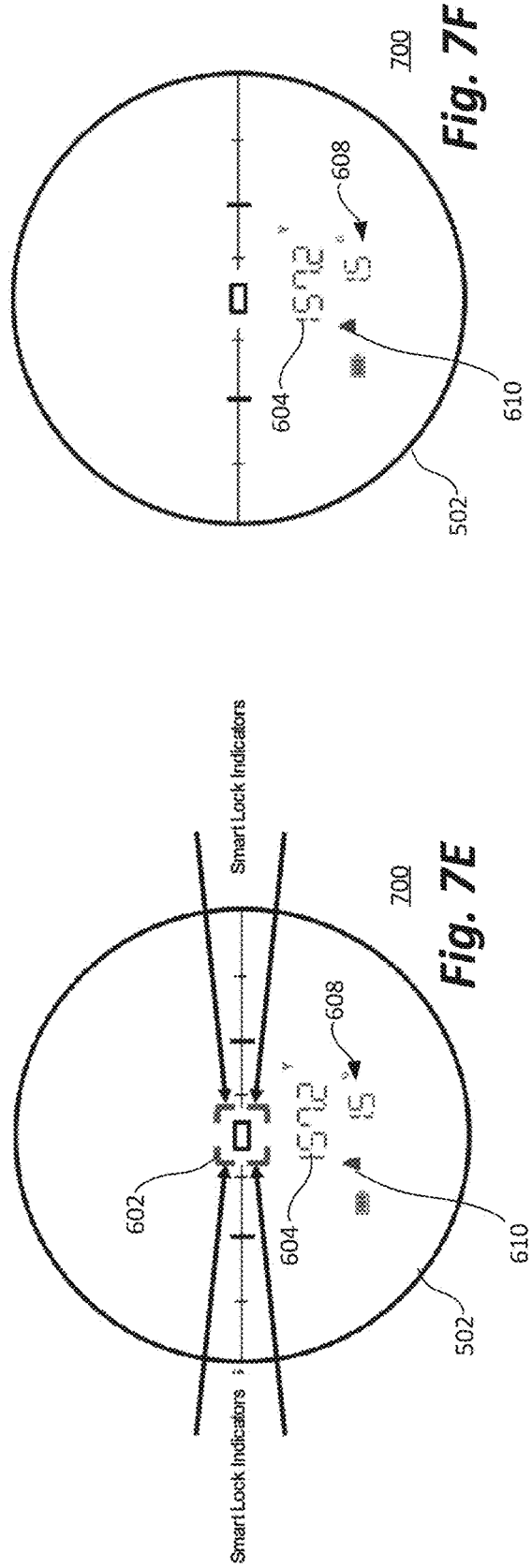

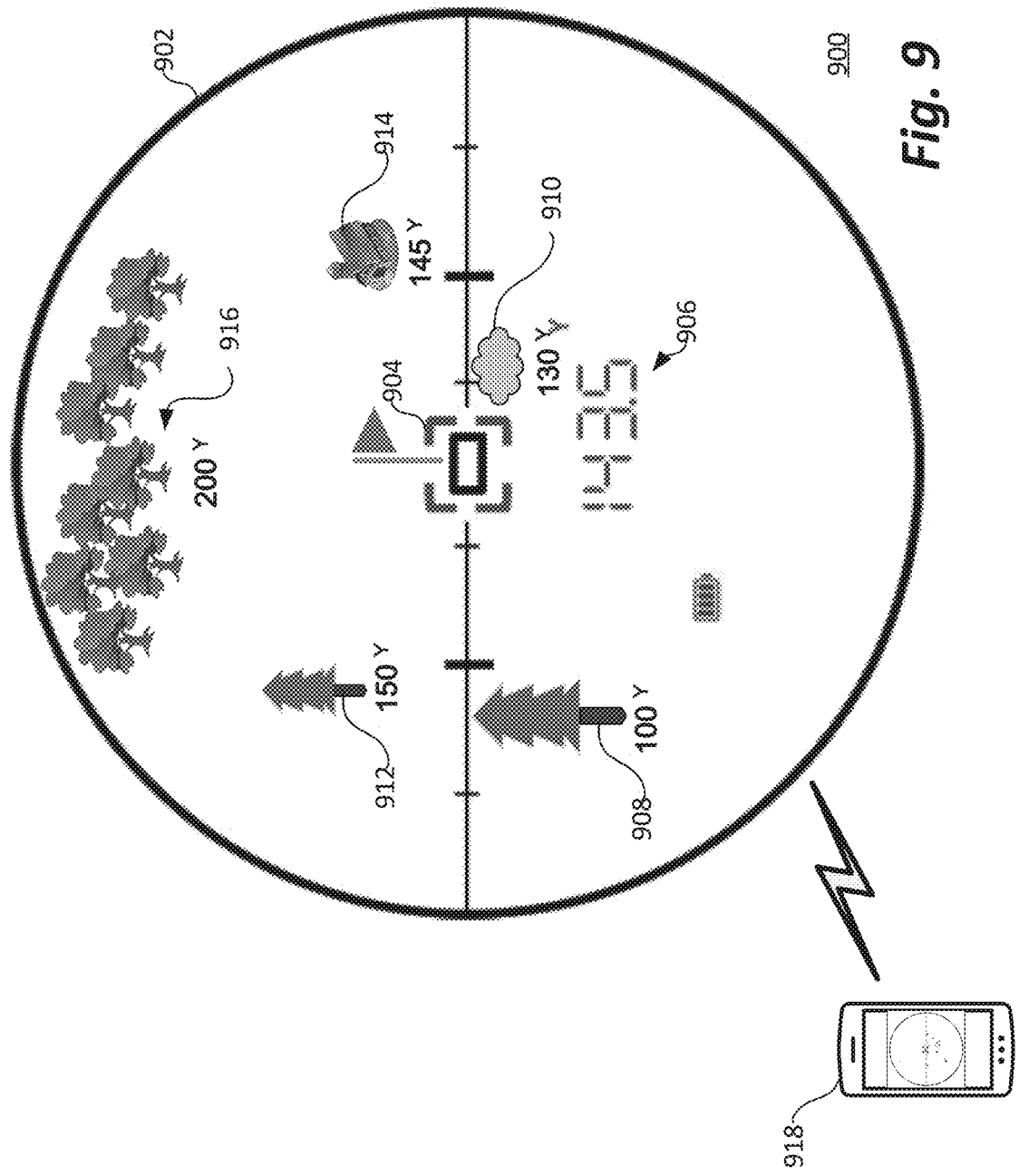

LASER-BASED RANGEFINDING INSTRUMENT

CROSS REFERENCE TO RELATED PATENT APPLICATIONS

The present invention is a continuation of, and claims priority to, U.S. Utility patent application Ser. No. 15/895,822 (the '822 application) for "Laser-Based Rangefinding Instrument", which in turn, claims priority to U.S. Provisional Patent Application Ser. No. 62/458,969 filed on Feb. 14, 2017. The present invention is also related to the subject matter of U.S. Design Patent Application Ser. No. 29/637,063 for: "Laser Rangefinder", now issued on Jun. 11, 2019 as D850,947, together with the '822 application both having been filed on Feb. 13, 2018, the disclosures of which are specifically incorporated by this reference in their entirety as if fully set forth herein.

COPYRIGHT NOTICE/PERMISSION

A portion of the disclosure of this patent document contains material which is subject to copyright protection. The copyright owner has no objection to the facsimile reproduction by anyone of the patent document of the patent disclosure as it appears in the United States Patent and Trademark Office patent file or records, but otherwise, reserves all copyright rights whatsoever. The following notice applies to the software and data and described below, inclusive of the drawing figures where applicable: Copyright © 2018, Laser Technology, Inc.

BACKGROUND OF THE INVENTION

The present invention relates, in general, to the field of laser-based rangefinding instruments. More particularly, the present invention relates to a laser-based rangefinding instrument of particular utility in golfing applications as well as those involving hunting or other sporting and recreational endeavors as well as professional measurement applications.

Laser-based rangefinders, such as those designed and produced by Laser Technology, Inc., Centennial, Colo., assignee of the present invention, operate to calculate distance by measuring the time of flight of very short pulses of infrared light. That is, a measurement is made as to the time it takes one or more laser pulses to travel to a target and back with a precision time base. With knowledge of the constant speed of light, the distance the laser pulses have traveled can then be calculated.

In order to increase accuracy, such laser rangefinders are designed to process multiple pulses in a single measurement period, with target acquisition times typically ranging from 0.3 to 0.7 seconds, although shorter or longer time periods may be employed. Sophisticated accuracy validation algorithms are then utilized to ensure reliable distance measurements and eliminate spurious signals due to noise and other factors.

In 1994, Laser Technology, Inc. pioneered, designed and developed the distance measurement functionality found in some of the most popular lines of commercial recreational rangefinding instruments currently available on the market. Representative of the company's proprietary technology is that disclosed in U.S. Pat. Nos. 5,574,552; 5,612,779; 5,652,651; 5,703,678; 5,880,821; 5,926,260; 6,057,910; 6,226,077 and 6,445,444, the disclosures of which are herein specifically incorporated by this reference in their entirety as if fully set forth herein.

SUMMARY OF THE INVENTION

In a representative implementation of a laser-based rangefinding instrument in accordance with the principles of the present invention, the exterior housing may comprise a polished metal surface similar to that of golf club heads in conjunction with golf grip type material to enable an improved, more secure grip on the unit. A carrying case of material and design similar to that of golf club head covers may also accompany the instrument.

The instrument external housing may further comprise a multi-function switch which enables settings to be directly controlled by dedicated mechanical buttons and switches. As disclosed herein, the multi-function switch is simpler and easier to operate and eliminates the necessity of conventional multiple button press menu navigation while a user looks through a viewfinder to confirm actions. A multi-function switch in accordance with the present invention may be implemented by a number of techniques including mechanical levers and switches or capacitive or magnetic sensors which can provide a similar operator experience but with improved environmental sealing along with other cost and design benefits. In a particular implementation disclosed herein the multi-function switch controls display brightness, the selection of measurement units and slope control but may also be expanded to include hunting laser functions such as ballistic trajectory curve selection as well as closest or farthest target display modes. The applications of the multi-function switch of the present invention may also be applied to the selection of settings and configurations in professional measurement instruments. In another particular implementation of the present invention, the slope function may be illuminated by an indicator LED designed to be highly visible to the user and others.

Another aspect of the present invention disclosed herein includes an approach assist reticle for the instrument which includes horizontal markings serving to represent specific distance widths at the target location. Such markings enable a user to remotely judge the width of the target area to assist in landing a projectile in the desired area. An approach reticle in accordance with the present invention may be implemented in a traditional LCD, OLED, LED active display or in a passive, fixed etched glass reticle. The exact reference distance or represented horizontal target distance widths may be varied in accordance with the particular implementation or application of the instrument.

A particular implementation of a laser-based rangefinding instrument in accordance with the present invention for golfing activities provides a perceived hitting distance adjustment for a golfer when shooting toward an uphill or downhill target. A compensated distance is calculated based on the target distance and the slope angle measurement and based upon golf ball flight data supported by currently available golf launch monitors. This Compensated Golf Distance is calculated by an algorithm based on curve fitting with a continuous mathematical function. In the representative embodiment of the present invention disclosed herein, the final output displays either a straight line distance or the compensated distance to the target.

A further aspect of the present invention includes the incorporation of an augmented reality display of the target and surrounding features and objects which enables the overlay of multiple laser distance measurement with a graphical in-sight display, with each approximately positioned over the real world view of the corresponding physical target. In an implementation of a laser-based rangefinding instrument incorporating such a display, such an instrument might include a high resolution graphical in-sight display, an electronic compass and/or gyro to measure horizontal direction, an inclinometer to measure positive or negative inclination and a laser rangefinder section for measuring distance. GPS information may also be included to note the location of the instrument at the time of each measurement, allowing for the relocation of the viewing point while still properly positioning the overlay of each previous measurement within the new field of view. As the instrument is aimed at different viewing areas the display would then be updated with any previously stored measurements of specific targets that come into the visual field of view and such stored measurements can be displayed in the field of view even if the instrument wasn't re-triggered.

In yet another implementation of an instrument in accordance with the present invention, the instrument may further comprise a virtual "Smart Lock"™ indicator and vibration feature to provide the user with visual audible and physical feedback when multiple targets are registered and the closest target is displayed. The visual indication may be conveniently provided by "flashing" the displayed information in the in-sight display, for example, at a momentary higher brightness level. Physical and mild audible feedback to the user may be provided by an internally mounted vibro-motor and/or an audio output device such as a speaker or buzzer. In a particular embodiment of this aspect of the present invention, visual feedback may be provided by additional in-sight display indicators illuminating around the aiming reticle such as the Smart Lock indicator disclosed in greater detail hereinafter.

Another aspect of the invention disclosed herein for golfing applications is a putting assist algorithm for determining a two dimensional (2D) missing line which enables a user to stand at their ball location on a putting green and, by taking a single laser measurement to either the flag or the hole, display the horizontal (i.e. level) distance (e.g. in feet) to the hole and the difference in elevation to the hole (e.g. in inches) with a negative difference indicative of the hole being at a lower elevation from the ball and a positive difference indicative that the hole is at a higher elevation. In operation, the algorithm would then utilize distance and inclination measurement data to calculate the 2D missing line between the ball and the hole. An assumption will be used for the instrument height from where the measurement is taken to allow for the correct calculation, the assumption being the average height of a typical golfer or at another determined height wherein, as an example, a calibration mode may be provided and the instrument measures the distance to the ground from the user's eye height to determine the exact instrument height for a given operator. The putting assist mode may be enabled, for example, by either a dedicated button on the instrument or as an additional enablement through use of the multi-function switch.

In accordance with yet another aspect of the present invention, the instrument may also provide additional correction factors to the Compensated Golf Distance by measuring ambient temperature, atmospheric pressure and humidity by means of sensors in the instrument in order to determine a relative density altitude which will impact the flight distance of a golf ball. Such factors and information need not be visually provided to the user of the instrument but would be utilized as an overall correction to the Compensated Golf Distance applied as referenced to a standard set of environmental conditions (e.g. 25° C. and sea level with 20% relative humidity. Alternatively, a possible calibration or system setup may be provided which identifies a user's "home course" as the reference standard set of environmental conditions.

Particularly disclosed herein is a laser-based rangefinding instrument having a unique, ergonomic configuration and feel which may additionally comprise golf grip type material and texture to facilitate a more secure grip on the instrument and stabilization in damp or wet conditions such as may be encountered on a golf course. An instrument in accordance with the present invention further incorporates a multi-function switch located on the side of the instrument housing that enables user selection of in-sight display brightness, selection of distance units of measure as well as the selection of the display of either line-of-sight or slope distance and angle for "Compensated Golf Distance" information based upon ball flight and trajectory data represented by a curve fit based upon a single continuous function.

Further disclosed herein is an "Approach Assist Reticle"™ comprising an etched glass display for enabling a user to estimate the width of a green at a determined distance of, for example, 150 yards. An exemplary laser-based rangefinding instrument in accordance with the present invention may also include a display flash or "Smart Lock" indicator.

Specifically disclosed herein is a rangefinding instrument which comprises a hand holdable housing, a processor disposed within the housing, a signal transmitting section coupled to the processor for directing a ranging signal toward a target and a signal receiving section coupled to the processor for detecting at least a portion of the ranging signal as reflected from the target. The instrument further comprises a user viewable display in the housing coupled to the processor for displaying a range to the target based upon data received from the signal transmitting and receiving sections and a user actuatable switching mechanism external to the housing, with the switching mechanism comprising a first display brightness control function and a second distance units display function.

In a particular implementation of the laser-based rangefinding instrument of the present invention, the instrument may further comprise an inclinometer coupled to the processor for indicating a slope angle of the instrument with respect to the target and a user actuatable slope display selection switch external to the housing for enabling the slope angle and slope distance to be selectively displayed in the user viewable display.

Also particularly disclosed herein is a reticle for a rangefinding instrument which comprises a centrally positioned target aiming point position in the reticle and at least first and second hash marks. The first and second hash marks are disposed laterally on opposing sides of the aiming point position at a fixed distance therefrom with the fixed distance being representative of a greater horizontal distance from the target at a determined distance of the rangefinding instrument from the target.

Still further disclosed herein is a rangefinding instrument which comprises ranging signal transmitting and receiving sections and a processor coupled to the ranging signal transmitting and receiving sections for determining distances to a plurality of targets located remotely from the instrument. The rangefinding instrument further comprises a display for providing a view of each of the plurality of targets with the processor determining a distance to a closest one of the plurality of targets and providing a perceptible identification of the closest one of the targets to a user of the instrument in the display.

Particularly disclosed herein is a method for assisting a golfer utilizing a rangefinding instrument incorporating a processor, data storage, an inclinometer and a display. The method comprises utilizing the rangefinding instrument to determine a line-of-sight distance to a point on a golf course, determining an angle of the point with respect to the golfer, applying the line-of-sight distance and the angle to the point to a continuous mathematical function which models golf ball flight data, computing a compensated golf shot distance with the processor based upon the mathematical function and numerically presenting the compensated golf shot distance to the golfer on the display.

Also particularly disclosed herein is a method for displaying information to a user of a rangefinding instrument which comprises determining a plurality of distance measurements between the rangefinding instrument and selected points in the user's field of view, overlaying the selected points on an optical field of view for the user, displaying the user's optical field of view and the selected points in a graphical display device, and visually associating at least a portion of the determined distance measurements to corresponding portions of the selected points in the display device.

Further particularly disclosed herein is a method for assisting a golfer utilizing a rangefinding instrument on a putting surface, the rangefinding instrument incorporating a processor, an inclinometer and a display. The method comprises utilizing the rangefinding instrument to determine a line-of-sight distance from a golf ball to a target point on the putting surface, determining an angle of inclination/declination from the golf ball to the target point with the inclinometer and displaying the horizontal distance and the relative elevation difference to the golfer on a display coupled to the processor.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIGS. 4A and 4B are respective top and left side views of an alternative embodiment of the laser-based rangefinding instrument of the preceding figures illustrating the incorporation of, for example, golf club grip type material overlying selected portions of the external housing;

FIG. 7A illustrates certain operational aspects of the laser-based rangefinding instrument of the preceding figure as projected upon an etched glass reticle in an embodiment of an in-sight display;

FIG. 7B illustrates the Smart Lock feature of the laser-based rangefinding instrument of the preceding figure having been triggered with the slope function of the instrument having not been enabled;

FIG. 7C illustrates that the laser-based rangefinding instrument of the preceding figure has successfully determined a range to a target with the Smart Lock feature having not been triggered;

FIG. 7D illustrates the change in displayed units of measure between yards and meters when the central button of the multi-function switch is depressed and held for a determined period;

FIG. 7E illustrates the illumination of bracket like Smart Lock indicators surrounding the central reticle when, for example, the laser-based rangefinding instrument of the present invention is employed in a golfing application;

FIG. 7F illustrates the information conveyed in the in-sight display of a "Compensated Golf Distance" range when the slope switch of the multi-function switch is enabled;

FIG. 9 illustrates exemplary information that may be presented to a user of an alternative embodiment of the laser-based rangefinding instrument of the present invention incorporating an augmented reality display wherein the instrument logs multiple distances to surrounding features adjoining a targeted feature for display on the instrument itself or an associated smartphone, tablet computer or the like.

DESCRIPTION OF A REPRESENTATIVE EMBODIMENT

Figure 1A:
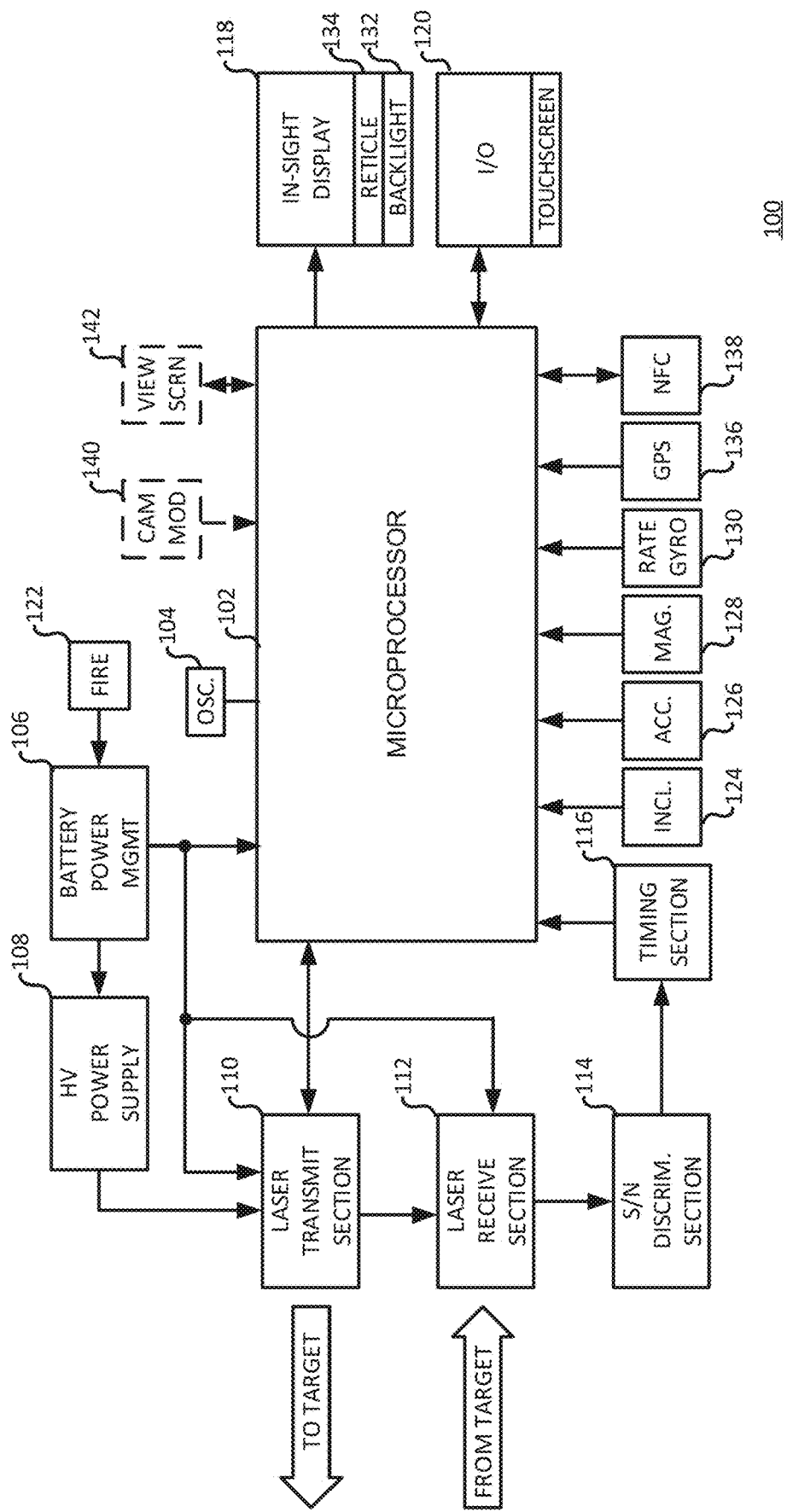
FIG. 1A is a representative functional block diagram of a laser-based rangefinding instrument in accordance with the principles of the present invention.

With reference now to FIG. 1A, a representative functional block diagram of a laser-based rangefinding instrument 100 is shown in accordance with the principles of the present invention.

The exemplary instrument 100 comprises a microprocessor 102 or central processing unit (CPU) with an associated oscillator 104 (where required) for providing clocking signals to the microprocessor 102. A battery and power management section 106 supplies operating power to the microprocessor 102 and various other instrument subsystems (not shown) as well as the high voltage (HV) power supply 108 which provides operating voltage to a laser transmit section 110 and associated laser diode as well as a laser receive section 112 and associated photodiode.

The laser receive section 112 receives a portion of the laser energy transmitted by the laser transmit section 110 as reflected by a target to a photodiode and provides the return signals to a signal/noise (S/N) discriminator section 114 in order to separate true return pulses from any associated noise. A timing section 116 accurately measures the time between the transmission of laser pulses from the laser transmit section 110 and the reception of the same target reflected pulses at the laser receive section 112 to determine, in conjunction with the microprocessor 102, the distance to the particular target towards which the instrument 100 is aimed.

A fire button 122 is coupled to the battery and power management section 106 and is operable by a user of the instrument 100 in conjunction with the microprocessor 102 to determine when to emit pulses toward a target from the laser transmit section 110.

The instrument 100 may also incorporate a user viewable in-sight display 118 implemented in conjunction with a novel and proprietary backlighting technique which may include a view of the target in conjunction with an aiming reticle as well as information regarding the range to the target, battery condition and other information. In certain embodiments, the instrument 100 may also comprise a touchscreen display to allow the user to provide inputs to the instrument 100 in conjunction with, or as an alternative to, an input/output (I/O) section 120.

The I/O section 120 may further comprise a keypad or other means of communicating information to or from the microprocessor 102 including wired connections such as a universal serial bus (USB) and the like as well as wireless connections such as an IEEE 802.11 (WiFi), or other wireless local area network (WLAN) transceiver; a Bluetooth transceiver or other personal area network (PAN) system for wirelessly exchanging data over short distances; and/or another near field communication (NFC) transceiver (inclusive of infrared (IR) coupling) for wirelessly coupling the instrument 100 to external devices or data storage elements.

As illustrated, the instrument 100 may further include one or more of additional input modules such as an inclinometer 124, accelerometer 126, magnetic sensor 128 (e.g. a compass) and/or rate gyro 130.

As an exemplary utilization of the backlighting technique for LCDs and other display devices in electronic instruments or the present invention, the instrument 100 is illustrated as incorporating a backlight 132. In a representative embodiment of the instrument 100 of the present invention, the backlight 132 may be advantageously provided in accordance with the specification and teachings of commonly owned U.S. patent application Ser. No. 15/249,163 filed on Aug. 26, 2016 for: "Backlighting Technique for Liquid Crystal and Other Displays in Electronic Instruments", the disclosure of which is specifically incorporated by this reference in its entirety as if fully set forth herein.

As further illustrated, the instrument 100 may comprise a reticle 134 interposed between the backlight and the in-sight display 118 as will be more fully described hereinafter. A global positioning satellite (GPS) module 136 may also form a portion of the instrument 100 to provide information to the microprocessor 102 as to the specific geographic position of the instrument 100. In addition, and as previously noted, the instrument 100 may further include an NFC module 138 capable of enabling external bidirectional communication with the instrument 100 via Bluetooth, WiFi and the like in conjunction with a smartphone, tablet device, computer laptop etc.

In an alternative embodiment of the present invention, the instrument may further be configured to provide an augmented reality display to a user by the additional provision of an advanced in-scope display or camera module 140 and view screen 142. In this manner, by angularly scanning the instrument 100 about a target object, other features and objects in the surrounding scene can be displayed in the view screen 142 (or in-sight display 118 and/or the screen of an associated smartphone, tablet device or laptop) to a user of the instrument 100 along with the determined distances to such additional features and objects to provide additional terrain context over and above the distance to the desired target. Such features and objects might be, depending on the particular application of the instrument 100, trees, sand traps, game feeding stations, buildings and the like. The in-scope display or camera module 140 is then operational to log the surrounding features and objects, their distances determined by the laser-based rangefinding instrument 100 and this information displayed in a picture to a user of the instrument 100, whether on the instrument itself or on the screen of any associated device.

Figure 1B:
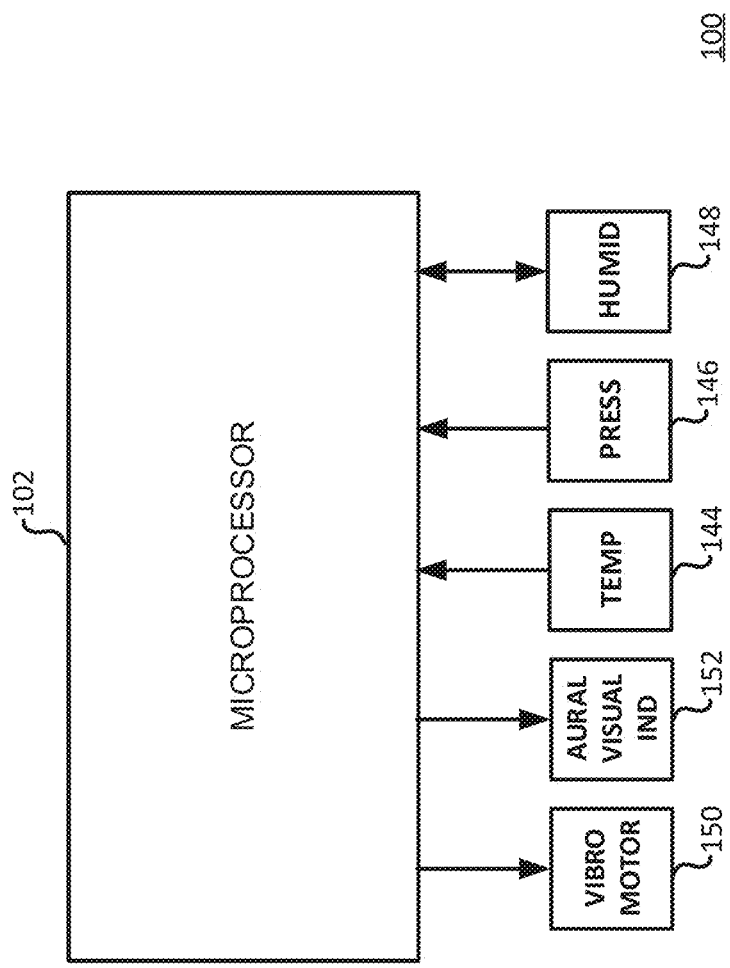
FIG. 1B is a representative portion of the functional block diagram of the laser-based rangefinding instrument of the preceding figure illustrative of another embodiment of the present invention incorporating temperature, atmospheric pressure and humidity sensors in addition to the functional elements shown previously.

With reference additionally now to FIG. 1B, a representative portion of the functional block diagram of the laser-based rangefinding instrument 100 of the preceding figure is shown illustrative of another embodiment of the present invention incorporating temperature 144, atmospheric pressure 146 and humidity 148 sensors in addition to the functional elements shown previously. The addition of these sensors serves to enable additional correction factors to the Compensated Golf Distance algorithm to provide a compensated golf distance by measuring local temperature, pressure and humidity and determining a relative density altitude which will impact the flight distance of a golf ball. The output of the temperature, atmospheric pressure 146 and humidity sensors may, or may not, be displayed to a user but would be applied as an overall correction to the compensated golf distance as referenced to a standard set of environmental conditions (e.g. 25° C., at sea level with 20% relative humidity). Alternatively, the output of the sensors 144, 146, 148 could be utilized to provide a possible calibration or system setup that identifies a user's home course as the reference standard set of environmental conditions.

As illustrated, an instrument 100 in accordance with the present invention may further incorporate a vibro-motor 150 and one or more audio and/or visual indicators 152 as previously described to provide physical, haptic and audible and/or visible feedback to the user of certain operational conditions.

Figure 2C:
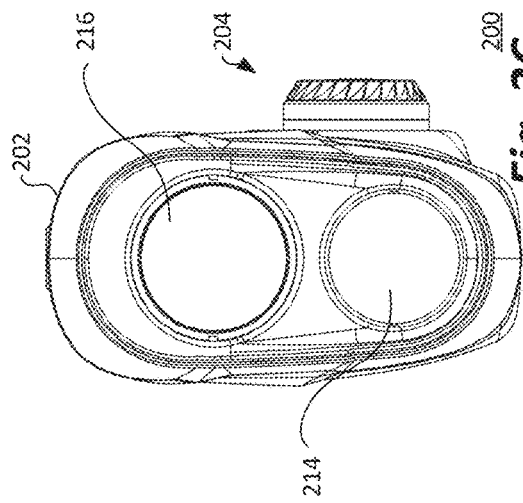
FIG. 2C is a front end view of the laser-based rangefinding instrument of the preceding figures illustrating the laser ranging signal transmission and reception ports thereof.
Figure 2D:
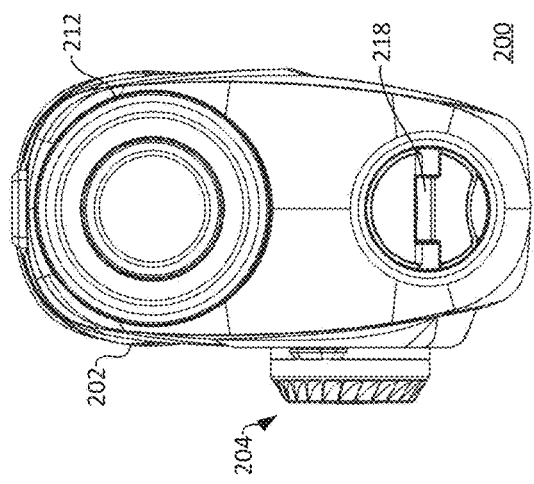
FIG. 2D is a rear end view of the laser-based rangefinding instrument of the preceding figures illustrating the instrument eyepiece and battery compartment retention cap thereof.
Figure 2A:
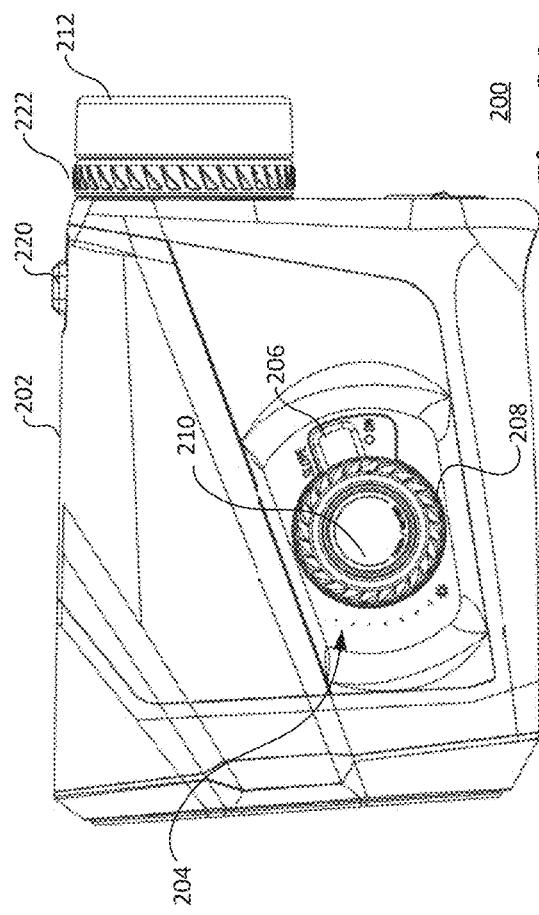
FIG. 2A is a right side view of a particular embodiment of a laser-based rangefinding instrument in accordance with the principles of the present invention illustrative of the external housing and the multi-function switch.

With reference additionally now to FIG. 2A, a right side view of a particular embodiment of a laser-based rangefinding instrument 200 in accordance with the principles of the present invention is shown illustrative of the external housing 202 and the multi-function switch 204. The multi-function switch 204, which will be more fully described hereinafter, comprises a slope function on/off switch 206, an annular display brightness control knob 208 and a centrally located depressible distance units (e.g. yards or meters) button 210. The instrument 200 further incorporates an adjustable eyepiece 212 and a laser signal fire button 220. The fire button 220 is analogous to the fire button 122 of the instrument 100 of FIG. 1A.

The multi-function switch 204 enables a user of the instrument 100 to quickly change operational features without having to navigate a complicated or time-consuming menu in the middle of a target ranging activity. While looking through the display, the multi-function switch 204 enables one to easily change the brightness units, units of distance measurement and slope function without fumbling through menu driven settings.

The brightness control knob 208 of the multi-function switch 204 serves to adjust the brightness of the backlit LCD display of the instrument 200 and will either brighten or dim the display depending on the direction of rotation of the brightness control knob 208. In an exemplary implementation of the instrument 200, there may be advantageously provided eight (8) different brightness settings. A diopter adjustment 222 enables a user of the instrument 200 to adjust focus with respect to the LCD display.

Figure 2B:
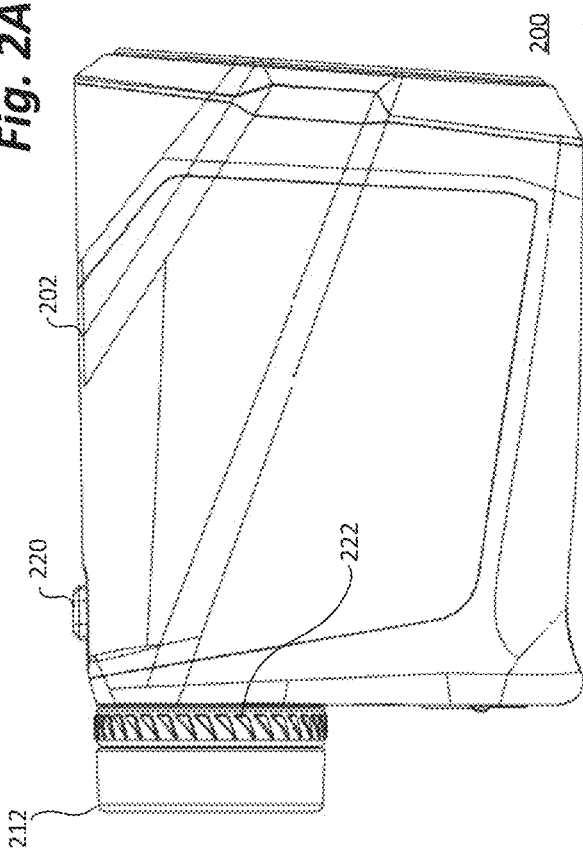
FIG. 2B is a left side view of the embodiment of the laser-based rangefinding instrument of the preceding figure.

With reference additionally now to FIG. 2B, a left side view of the embodiment of the laser-based rangefinding instrument 200 of the preceding figure is shown. Like structure to that previously described with respect to FIG. 2A is like numbered and foregoing description thereof shall suffice herefor.

With reference additionally now to FIG. 2C, a front end view of the laser-based rangefinding instrument 200 of the preceding figures is shown additionally illustrating the laser ranging signal transmission and reception ports 214, 216 respectively. In the particular embodiment of the instrument 200 shown, the visual path providing a view of a target object or feature to a user of the instrument 200 at the eyepiece 212 is through the laser ranging signal reception port 216.

With reference additionally now to FIG. 2D, a rear end view of the laser-based rangefinding instrument 200 of the preceding figures is shown illustrating the housing 202, instrument eyepiece 212, the multi-function switch 204 and the battery compartment retention cap 218 thereof.

Figure 2F:
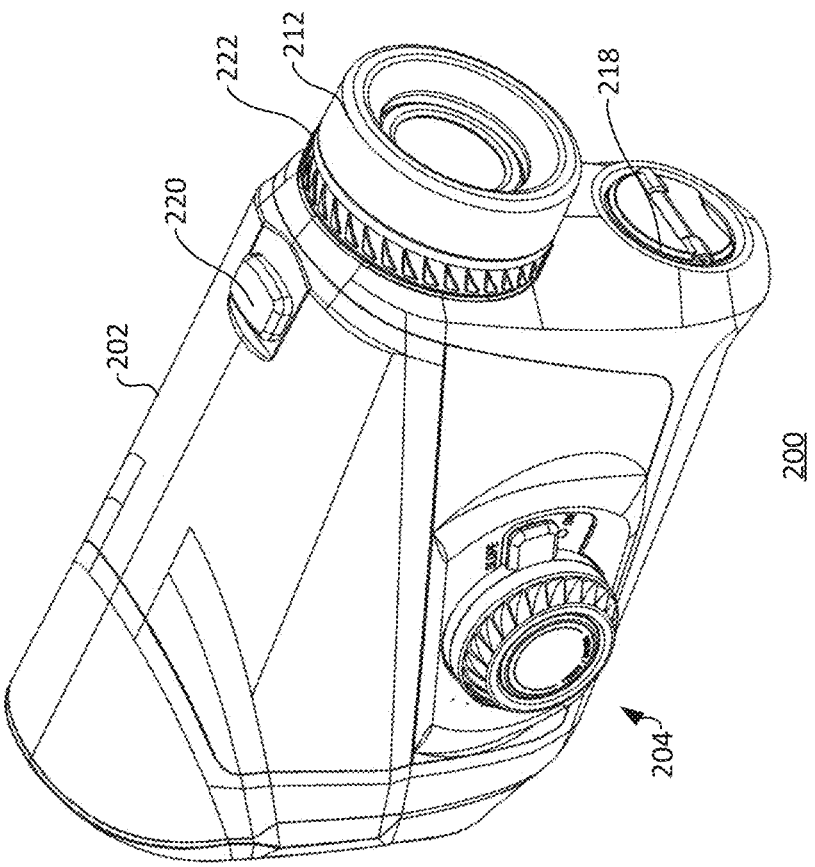
FIG. 2F is an isometric view of the laser-based rangefinding instrument of the preceding figures.
Figure 2E:
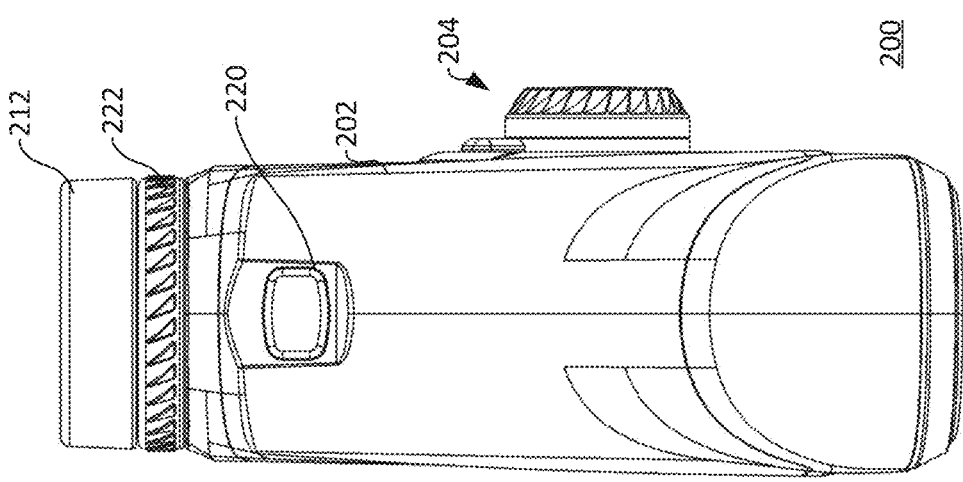
FIG. 2E is a top view of the laser-based rangefinding instrument of the preceding figures illustrating the laser ranging signal fire button thereof.

With reference additionally now to FIG. 2E, a top view of the laser-based rangefinding instrument 200 of the preceding figures is shown illustrating the housing 202, multi-function switch 204, eyepiece 212 and laser ranging signal fire button 220 thereof.

With reference additionally now to FIG. 2F, an isometric view of the laser-based rangefinding instrument 200 of the preceding figures is shown. Illustrated in this view is the housing 202, multi-function switch 204, eyepiece 212, battery compartment retention cap 218 and the fire button 220.

Figure 3:
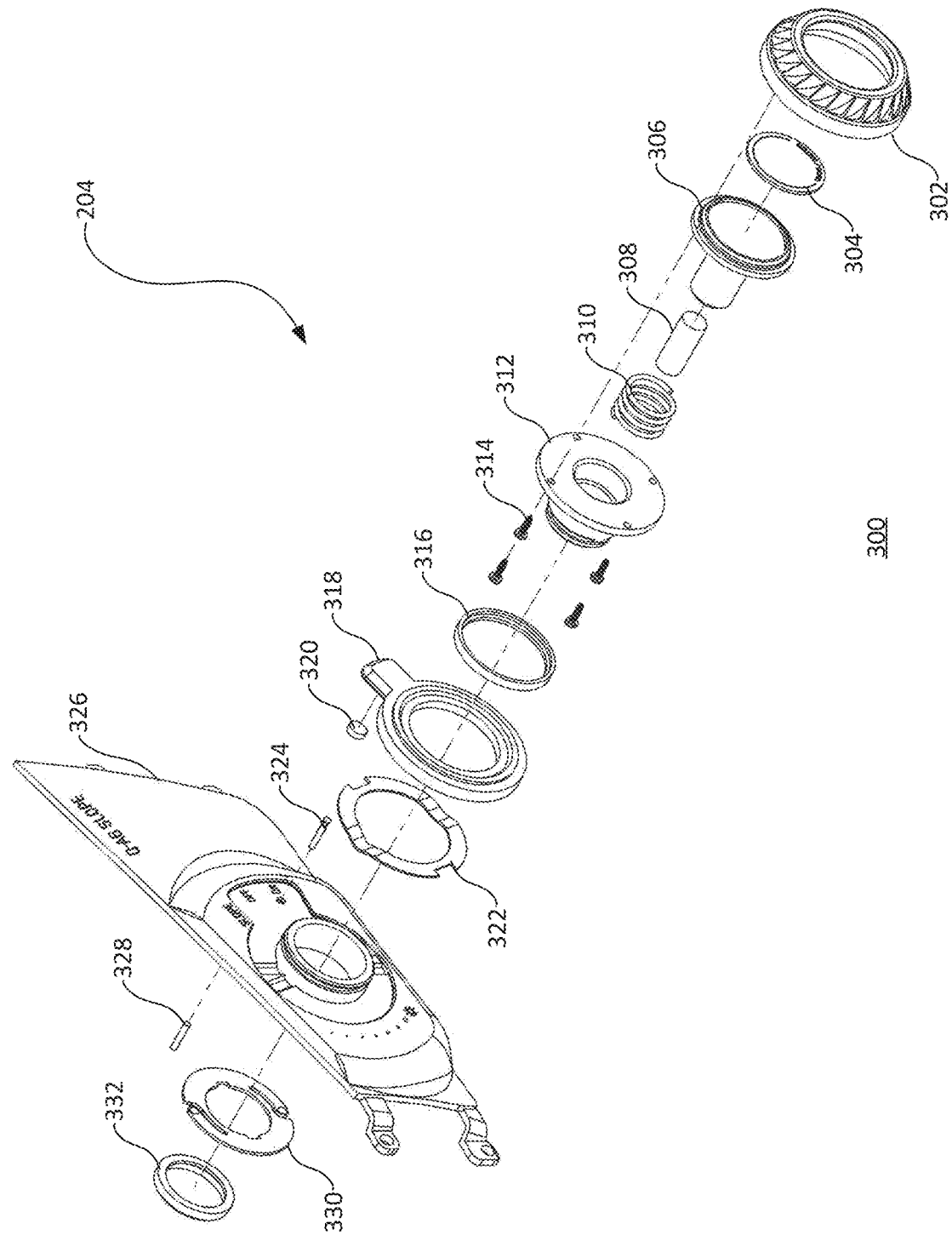
FIG. 3 is an exploded isometric view of the multi-function switch of the laser-based rangefinding instrument as shown in the preceding figures.

With reference additionally now to FIG. 3, an exploded isometric view 300 of the multi-function switch 204 of the laser-based rangefinding instrument 200 as shown in the preceding figures is depicted in greater detail. Specifically, the multi-function switch 204 comprises a moisture resistant mechanism mounted externally to the housing 202 (FIGS. 2A through 2F) of particular utility in damp or wet environments. The multi-function switch 204 allows a user of the instrument 200 to adjust display brightness by means of the brightness control knob 208, select units of range measurement (e.g. yards or meters) with button 210 and display either a line-of-sight range or an angle adjusted "Compensated Golf Distance" range by enabling the slope switch 206. All of these functions can be controlled with just one of the instrument 200 user's hands and without the need for a menu-driven function in the in-sight display.

In a specific embodiment, the multi-function switch 204 may be implemented through magnetic coupling in order to protect the internal components of the instrument 100 from external environmental conditions. In such an implementation, the multi-function switch 204 may comprise a knob 302 (the annular brightness control knob 208), a decal plate 304, a button 306 (the distance units button 210), a button magnet 308, a button spring 310 and a spring retainer 312 with a number of associated screws 314. The multi-function switch 204 further comprises a retaining ring 316, slope switch 318 (the slope function on/off switch 206), a slope switch magnet 320, an associated slope switch spring 322 and a light pipe 324 all mounted externally to the instrument 200 housing 202 (FIGS. 2A through 2F). As illustrated the multi-function switch 204 further comprises a ferrous pin 328, a detent wheel 330 and a retaining ring 332 mounted internally to a trim plate 326 forming a portion of the instrument 200 housing 202.

With reference additionally now to FIGS. 4A and 4B, respective top and left side views of an alternative embodiment 400 of the laser-based rangefinding instrument 200 of the preceding figures is shown illustrating the incorporation of, for example, golf club grip type material and texture 404 overlying selected portions of the external housing 402 which may be provided in polished metal similar to that utilized in golf club heads. In an exemplary embodiment of the laser-based rangefinding instrument 200, the golf club grip type material may comprise thermoplastic rubber (TPR) in a pattern which effectively duplicates grips applied to the shafts of golf clubs themselves to provide the instrument 200 with a tactile interface with substantially the same feel of stabilization and effectiveness of grip in all conditions including humid, damp or wet environments. Other possible grip type material 404 may comprise thermoplastic polyurethane (TPU), rubber or other suitable materials with a corded, wrapped, ribbed or other suitable texture.

Figure 5:
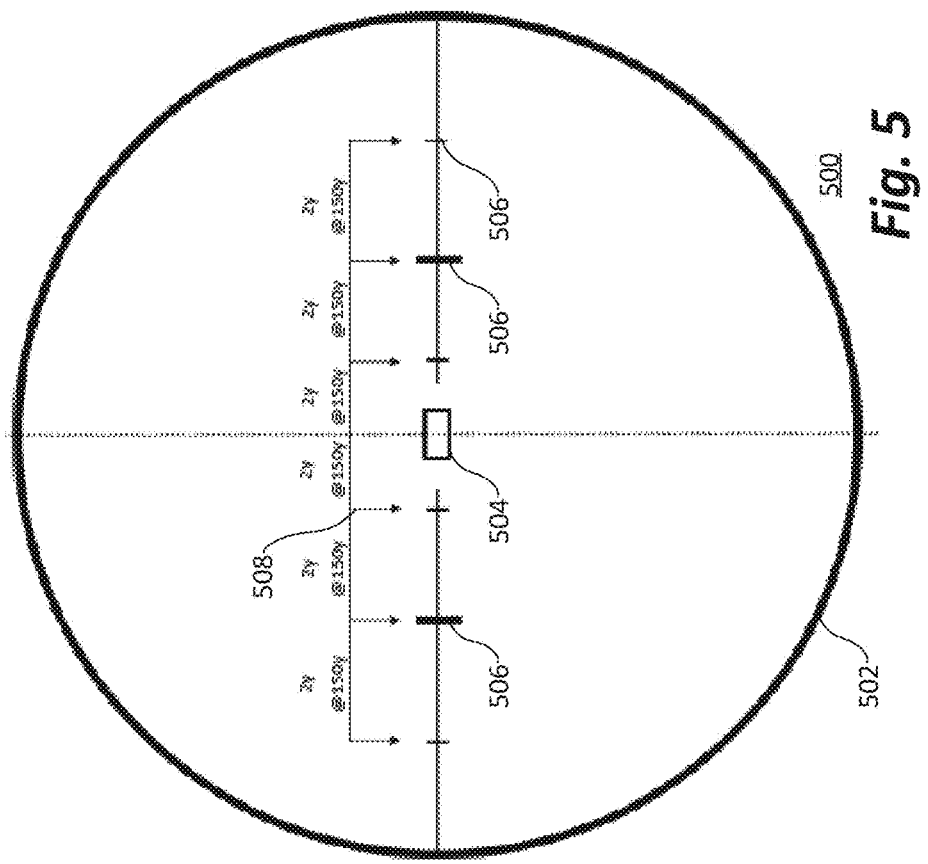
FIG. 5 is a view of a novel etched glass reticle for possible incorporation into the laser-based rangefinding instrument of the preceding figures for viewing in conjunction with an in-sight display at the ocular end of the instrument adjoining the eyepiece.

With reference additionally now to FIG. 5, a view of a novel etched glass reticle 500 for possible incorporation into the laser-based rangefinding instrument 200 of the preceding figures is shown for viewing in conjunction with an in-sight display at the ocular end of the instrument adjoining the eyepiece 212. The exemplary etched glass reticle 500 comprises a transparent (or translucent) substrate of glass 502 which is viewable in conjunction with a backlit liquid crystal display (LCD) as will be more fully described hereinafter. The novel reticle 500 incorporates a centrally located aiming point (in this case a rectangular box 504) with a number of horizontally disposed hash marks 506 extending laterally therefrom.

In a representative embodiment of the etched glass reticle 500 for incorporation in an instrument 200 intended for golfing activities, the hash marks 506 are set to each represent a lateral displacement of two (2) yards from the aiming point and each other at a determined distance of one hundred fifty (150) yards. In the embodiment of the etched glass reticle 500 shown, the inside dimensions would appear to be 14 inches high and 20 inches wide at a distance of 150 yards, which is the same size and dimensions of a standard golf flag. In use, the etched glass reticle 500 of the present invention will readily enable a golfer to determine lateral distances from the pin when the instrument 200 is aimed with that as the target. Differing representative hash mark separations can be utilized in conjunction with another determined distance instead of 150 yards without deviating from the scope of the inventive concepts of the etched glass reticle 500.

Figure 6:
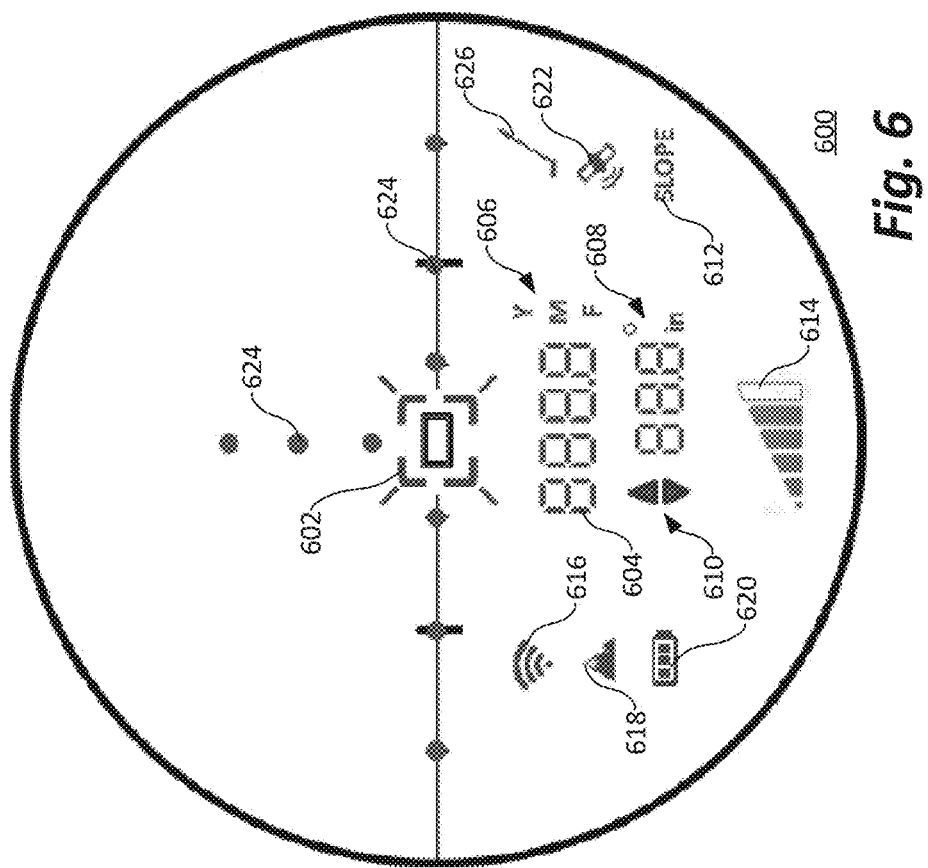
FIG. 6 is a view of an in-sight display overlaid upon an etched reticle for possible incorporation into the laser-based rangefinding instrument of the preceding figures and illustrative of certain information segments or icons which may be selectively presented to a user of the instrument when in particular operational modes, for example, as a golfing application rangefinding instrument.

With reference additionally now to FIG. 6, a view of an in-sight LCD display 600 overlaid upon the etched reticle 500 of the preceding figure is shown for possible incorporation into the laser-based rangefinding instrument 200 of the preceding figures and illustrative of certain information segments or icons which may be selectively presented to a user of the instrument when in particular operational modes, for example, as a golfing application rangefinding instrument.

In an exemplary embodiment of the instrument 200, the backlighting for the LCD display 600 may be advantageously provided in accordance with the disclosure of U.S. patent application Ser. No. 15/249,163 as previously noted. The possible information segments and icon which may be employed in a representative embodiment of a laser-based rangefinding instrument 200 of the present invention include a "Smart Lock" indicator 602 which surrounds and highlights the central aiming point in certain operational modes as will be more fully described hereinafter. The determined distance 604 to the selected feature or object toward which the instrument 200 is aimed is displayed numerically as shown in conjunction with the selected units of measure (e.g. yards, meters, feet) as determined by user selection via the distance units button 210 of the multi-function switch 204.

When the slope function on/off switch 206 is in the "slope" position, the displayed determined distance 604 will then be the "Compensated Golf Distance" instead of the line-of-sight distance taking into account the angular displacement of the target point either upwards or downwards from the horizontal as determined by, for example, inclinometer 124 (FIG. 1A). The inclination from the instrument 200 to the aiming point is indicated in degrees from the horizontal as shown at reference numeral 608 with the corresponding one of the arrows at reference numeral 610 indicating whether the target point is above or below the horizontal.

In a representative embodiment of the instrument 200, the "Compensated Golf Distance" when in slope mode is a function of the line-of-sight distance, the angle of inclination and golf ball flight characteristics data represented by a curve fit based on a single continuous function. Golf ball flight characteristics data available from, for example, Foresight Sports, San Diego, California; Trackman Golf, Scottsdale, Arizona or other sources may be utilized and other methods of determining the "Compensated Golf Distance" may be employed without departing from the scope of the present invention.

The LCD display 600 may also provide an indication that the slope function on/off switch 206 is in the "on" position as indicated a numeral 612, the strength of the laser distance measurement return is indicated at numeral 614. Other LCD indications include WiFi signal strength, density altitude, battery strength and GPS indications as shown at numerals 616, 618, 620 and 622 respectively. The dots indicated by numeral 624 may indicate distances corresponding to the previously identified hash marks 506 shown in the preceding figure. In addition, a putter feature 626 is indicate wherein a two dimensional (2D) missing line routine may be implemented in the instrument 100 as incorporated in professional measurement devices available from Laser Technology, Inc.

It should be noted that the in-sight LCD display 600 and etched glass reticle 500 may either be used together or separately with the in-sight LCD display 600 possibly incorporating the same instrument 100 ranging benefits without the etched glass reticle 500.

Figure 7G:
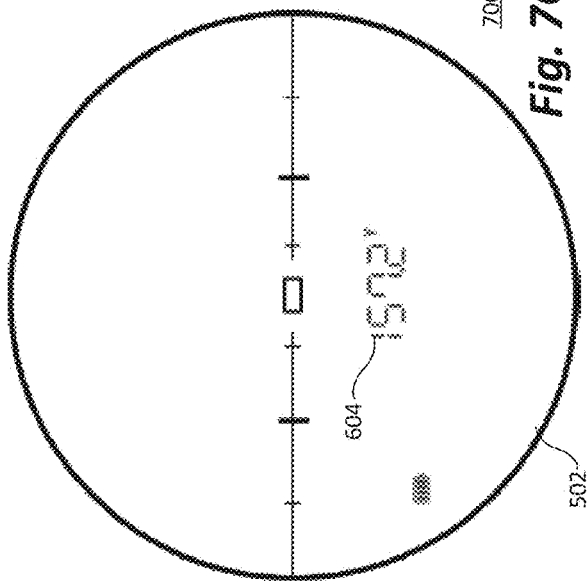
FIG. 7G illustrates the information conveyed in the in-sight display of a line of sight range when the slope switch of the multi-function switch is not enabled.

With reference additionally now to FIG. 7A, certain operational aspects of the laser-based rangefinding instrument 200 of the preceding figure are illustrated as projected by a backlit LCD display upon the etched glass reticle 500 in an embodiment of an in-sight display in accordance with the present invention. With respect to this figure and succeeding FIGS. 7B through 7J inclusive, like structure and information previously described is like numbered and the foregoing description shall suffice herefor.

With reference additionally now to FIG. 7B, the Smart Lock feature of the laser-based rangefinding instrument 200 of the preceding figure is illustrated as having been triggered with the slope and "Compensated Golf Distance" function of the instrument 200 having not been enabled by means of slope function on/off switch 206. This figure illustrates the view of the in-sight display once the Smart Lock has been triggered and the fire button 220 has been released.

With reference additionally now to FIG. 7C, the laser-based rangefinding instrument 200 of the preceding figure is illustrated as having successfully determined a range to a target with the Smart Lock feature having not been triggered. In this situation, once a range has been acquired and the fire button 220 has been released, the in-sight display will be as indicated with the slope and "Compensated Golf Distance" function of the instrument 200 having not been enabled by means of the slope function on/off switch 206.

With reference additionally now to FIG. 7D, the change in displayed units of measure between yards and meters is illustrated when the distance units button 210 of the multi-function switch 204 is depressed and held for a determined period, for example, 3 seconds.

With reference additionally now to FIG. 7E, the illumination of bracket like Smart Lock indicators 602 surrounding the central reticle is illustrated when, for example, the laser-based rangefinding instrument 200 of the present invention is employed in a golfing application. In a particular embodiment of the present invention, the instrument 200 may have the Smart Lock function preliminarily set to being enabled. On a successful range, a Smart Lock algorithm in the instrument 200 will detect two or more targets and the Smart Lock indicator 602 will illuminate with the displayed distance 604 being that of the closer of the detected targets. In an embodiment of the instrument 200 comprising a vibro-motor (e.g. element 150, FIG. 1B) it will be activated in conjunction with the Smart Lock indicator 602. The Smart Lock indicator 602 will remain illuminated until the fire button 220 is pressed again or the instrument 200 times out. The in-sight display may also pulse a brightness level some determined number of steps higher when the Smart Lock function is triggered.

With reference additionally now to FIG. 7F, the information conveyed in the in-sight display of a "Compensated Golf Distance" range is illustrated when the slope switch 206 of the multi-function switch 204 is enabled. In this instance the displayed distance 604 is the "Compensated Golf Distance" the angle of the ranged distance is shown at numeral 608 in 0.5 degree increments. The arrow at numeral 610 indicates whether the golf shot is uphill (up arrow) or downhill (down arrow. All indicators may remain illuminated until the fire button 220 is pressed or the instrument 200 times out.

With reference additionally now to FIG. 7G, the information conveyed in the in-sight display of a line of sight range when the slope switch 206 of the multi-function switch 204 in not enabled is shown. In this instance, the displayed distance 604 is the line of sight distance.

Figure 7H:
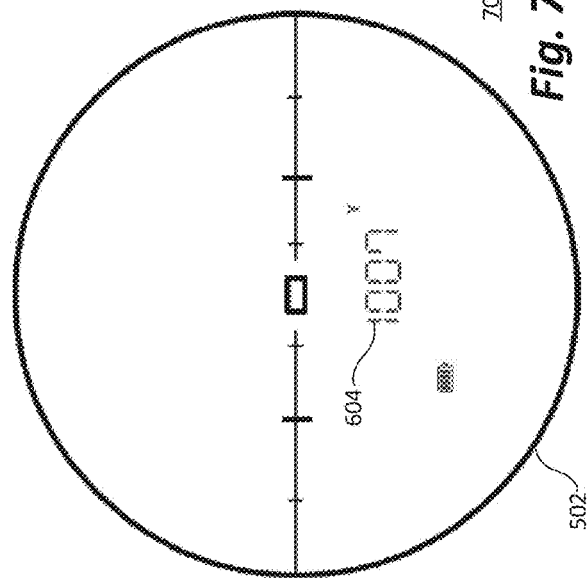
FIG. 7H illustrates the information conveyed in the in-sight display as whole values when the target acquired is farther than 999 units of measure away.

With reference additionally now to FIG. 7H, the information conveyed in the in-sight display is illustrated as whole values when the target acquired is farther than 999 units of measure.

Figure 7I:
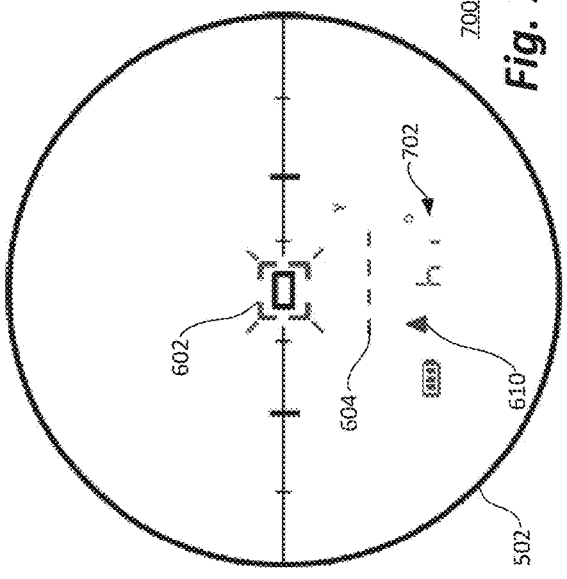
FIG. 7I illustrates the information conveyed in the in-sight display when the slope switch of the multi-function switch is enabled and the angle to the target is greater than a determined angle above the horizontal.

With reference additionally now to FIG. 7I, the information conveyed in the in-sight display is illustrated when the slope switch 206 of the multi-function switch 204 is enabled and the angle to the target is greater than a determined angle above the horizontal. In an exemplary embodiment of the instrument 200 when the angle of the instrument 200 is greater than 30° above the horizontal the in-sight display will indicate "hi" at numeral 702 and the "Compensated Golf Distance" will not be indicated at numeral 604. Alternatively, the line of sight range may be indicated instead of no distance.

Figure 7J:
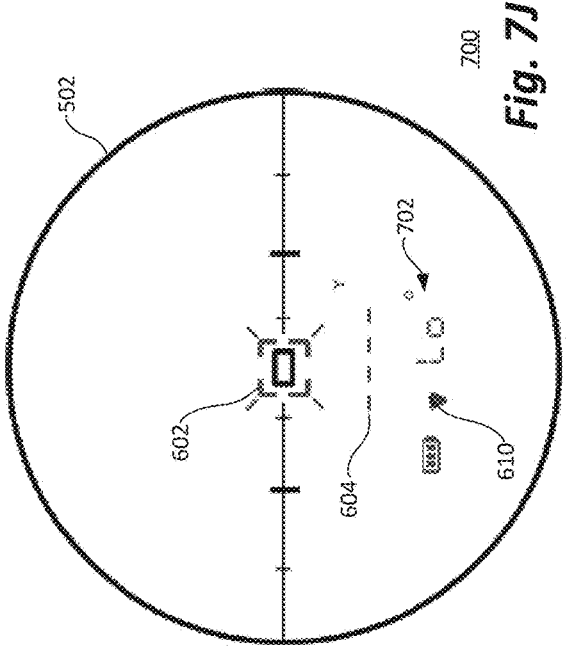
FIG. 7J illustrates the information conveyed in the in-sight display when the slope switch of the multi-function switch is enabled and the angle to the target is more than a determined angle below the horizontal.

With reference additionally now to FIG. 7J, the information conveyed in the in-sight display is illustrated when the slope switch 206 of the multi-function switch 204 is enabled and the angle to the target is more than a determined angle below the horizontal. In the same exemplary embodiment of the instrument 200 when the angle of the instrument 200 is more than 30° below the horizontal the in-sight display will indicate "Lo" at numeral 702 and the "Compensated Golf Distance" will not be indicated at numeral 604. Alternatively, the line of sight range may be indicated instead of no distance.

Figure 8:
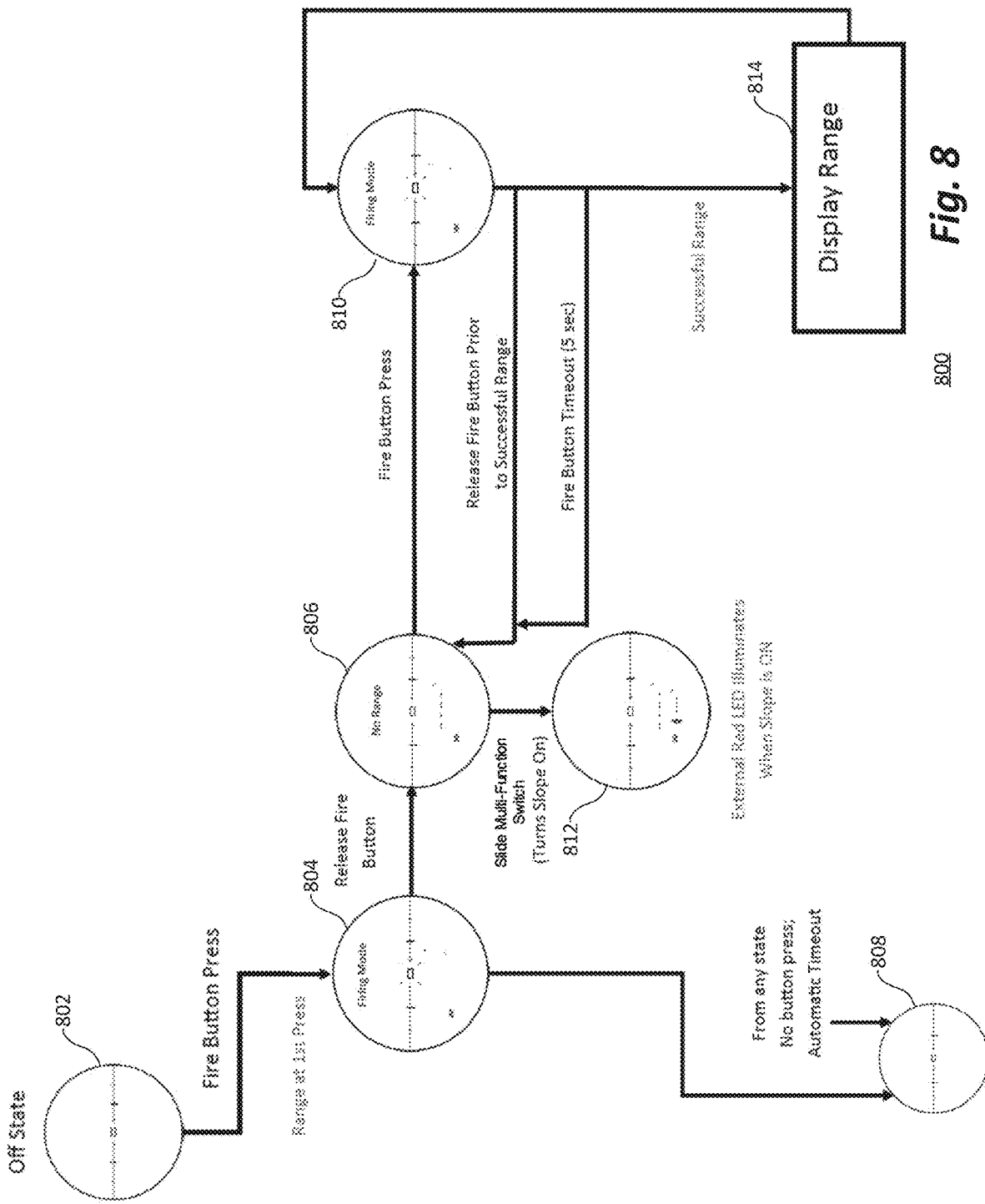
FIG. 8 is a representative illustration of a possible power on and fire button depression sequence in an exemplary laser-based rangefinding instrument in accordance with the present invention.

With reference additionally now to FIG. 8, a representative illustration of a possible power on and fire button depression sequence 800 is illustrated in an exemplary laser-based rangefinding instrument 200 in accordance with the present invention. At numeral 802, the instrument 200 is in the "off" state. When the fire button 220 is depressed the instrument 200 attempts to determine a range to the target at numeral 804. Once the fire button 220 is released if no range is determined at numeral 806, the fire button 220 is depressed again at numeral 810. Alternatively, if the fire button 220 is not again depressed, the instrument 220 will time out after a predetermined time.

At numeral 806, if the slope switch 206 of the multi-function switch 204 is enabled, the display will be as indicated at numeral 812. At numeral 810, if a successful range to the target is achieved, then the range will be displayed in the in-sight display at step 814. Alternatively, if the fire button 220 is released prior to the acquisition of a successful range or otherwise times out, then the sequence returns to the state at numeral 806.

In a representative embodiment of the instrument 200, the brightness of the display may be at a level of five out of eight or at the level of a previous power "on" level. On an initial power "on", if the fire button 220 is depressed for more than 10 seconds, the assumption is made that it is stuck and the instrument 200 is turned "off", in which case the instrument 200 will not turn back "on" until the fire button 220 is released and the instrument 200 times out and then the fire button 220 is depressed once again. Regardless of the current state of the instrument 200, it will time out and power "off" after 10 seconds from the last depression of the fire button 220. In operation, if the fire button 220 remains depressed for more than five seconds and no range is acquired, the instrument 200 will stop transmitting range pulses and return to a standby mode with a new firing not occurring until after the fire button 220 has been released.

With reference additionally now to FIG. 9, exemplary information that may be presented to a user of an alternative embodiment of the laser-based rangefinding instrument 200 of the present invention is illustrated as incorporating an augmented reality display 900 wherein the instrument is utilized to log multiple distances to surrounding features adjoining a targeted feature for display on the instrument itself or an associated smartphone, tablet computer or the like.

The exemplary augmented reality display 900 comprises a reticle 902 as previously illustrated and described along with a Smart Lock indicator 904 (as previously described with respect to the Smart Lock indicator 602 of FIGS. 6 and 7A through 7J inclusive). In operation, the instrument 200 is utilized to take individual distance measurements to various features or targets of interest in addition to the golf flag illustrated at distance 906. Such features and objects, along with their distances can, for example, include trees 908 and 912, sand trap 910, building 914 and woods 916. This information may be displayed in the instrument 200 or wirelessly communicated to smartphone 918 or other tablet computer or the like.

While there have been described above the principles of the present invention in conjunction with specific apparatus, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

As used herein, the terms "comprises", "comprising", or any other variation thereof, are intended to cover a non-exclusive inclusion, such that a process, method, article, or apparatus that comprises a recitation of certain elements does not necessarily include only those elements but may include other elements not expressly recited or inherent to such process, method, article or apparatus. None of the description in the present application should be read as implying that any particular element, step, or function is an essential element which must be included in the claim scope and THE SCOPE OF THE PATENTED SUBJECT MATTER IS DEFINED ONLY BY THE CLAIMS AS ALLOWED. Moreover, none of the appended claims are intended to invoke paragraph six of 35 U.S.C. Sect. 112 unless the exact phrase "means for" is employed and is followed by a participle.

What is claimed is:

1. A method for displaying information to a user of a hand holdable laser-based rangefinding instrument comprising:
   aiming said rangefinding instrument to a plurality of selected points remote from said rangefinding instrument inclusive of a desired target point of interest in said user's optical field of view through a laser ranging signal reception port of said instrument;
   determining with said rangefinding instrument distance measurements between said rangefinding instrument and said selected points inclusive of said target point of interest;
   overlaying said selected points on said optical field of view for said user;
   displaying said selected points in an in-sight graphical display device of said rangefinding instrument; and
   visually associating at least a portion of said determined distance measurements to corresponding portions of said selected points in said display device.

2. The method of claim 1 further comprising:
   additionally determining a primary distance measurement between said rangefinding instrument and said desired target in said user's optical field of view; and
   also visually associating said primary distance measurement with said desired target in said display device.

3. The method of claim 1 further comprising:
   determining at least one of compass heading to said desired target and positive or negative inclination of said desired target with respect to said rangefinding instrument; and
   additionally displaying said compass heading to or said inclination of said desired target in said display device.

4. The method of claim 1 further comprising:
   registering latitude and longitude coordinates of said rangefinding instrument when said plurality of distance and primary distance measurements are determined.

5. The method of claim 4 wherein said registered latitude and longitude coordinates enable relocation of said rangefinding instrument while maintaining said visually associated distance measurements to said selected points and said visually associated primary distance to said desired target as said user's optical field of view is changed.

6. The method of claim 4 further comprising:
   storing said determined distances to said selected points and said primary distance to said desired target; and
   continuing to visually associate said determined distance measurements to said selected points and said primary distance to said desired target in said display while said user's optical field of view is changed to an additional field of view.

7. The method of claim 6 further comprising:
   determining at least one additional distance measurement between said rangefinding instrument and an additional selected point in said additional optical field of view;
   displaying said additional field of view in said graphical display device;
   visually associating said at least one additional distance measurement to said additional selected point in said display device; and
   continuing to display said visually associated determined distance measurements to said selected points and said primary distance to said desired target in portions of said user's optical field of view overlapping in said additional field of view.

8. The method of claim 7 wherein said stored determined distances to said selected points and said primary distance to said desired target are displayed without further determination of said determined or primary distances.

* * * * *